United States Patent
Pedersen (10) Patent No.: US 10,846,432 B2
(45) Date of Patent: Nov. 24, 2020

(54) SECURE DATA LEAK DETECTION

(71) Applicant: OneLogin, Inc., San Francisco, CA (US)

(72) Inventor: Thomas Pedersen, San Francisco, CA (US)

(73) Assignee: OneLogin, Inc., San Francisco, CA (US)

( * ) Notice: Subject to any disclaimer, the term of this patent is extended or adjusted under 35 U.S.C. 154(b) by 184 days.

(21) Appl. No.: 16/127,931

(22) Filed: Sep. 11, 2018

(65) Prior Publication Data

US 2020/0082124 A1    Mar. 12, 2020

(51) Int. Cl.
*H04L 29/06* (2006.01)
*G06F 21/62* (2013.01)

(52) U.S. Cl.
CPC ........ *G06F 21/6263* (2013.01); *H04L 63/102* (2013.01); *H04L 63/1483* (2013.01)

(58) Field of Classification Search
CPC .......................... G06F 21/6263; H04L 63/102; H04L 63/1483
USPC ........................................................ 726/26
See application file for complete search history.

(56) References Cited

U.S. PATENT DOCUMENTS

| | | | |
|---|---|---|---|
| 5,751,812 A * | 5/1998 | Anderson | G06F 21/31 380/28 |
| 6,834,112 B1 * | 12/2004 | Brickell | G06F 21/31 380/279 |
| 7,152,244 B2 | 12/2006 | Toomey | |
| 7,228,417 B2 * | 6/2007 | Roskind | G06F 21/31 380/255 |
| 7,685,430 B1 | 3/2010 | Masurkar | |
| 7,958,555 B1 | 6/2011 | Chen | |
| 8,392,992 B1 | 3/2013 | Spertus | |
| 8,490,167 B2 | 7/2013 | Stecher | |
| 9,298,903 B2 | 3/2016 | Gupta | |
| 9,396,322 B2 | 7/2016 | Chougle | |
| 9,400,883 B2 | 7/2016 | Chougle | |
| 10,262,129 B1 * | 4/2019 | Gupta | G06F 21/31 |
| 2004/0019786 A1 * | 1/2004 | Zorn | H04W 12/04 713/168 |
| 2005/0010483 A1 | 1/2005 | Ling | |

(Continued)

FOREIGN PATENT DOCUMENTS

WO        WO2009089706        7/2009

OTHER PUBLICATIONS

English Abstract of PCT Publication WO 2009/089706, dated Jul. 23, 2009.

(Continued)

*Primary Examiner* — Michael S McNally (74) *Attorney, Agent, or Firm* — Vierra Magen Marcus LLP (57) ABSTRACT

A system to detect leaks of secure data (e.g., passwords) includes a browser extension (or other software) identifying information (e.g., a password) input to a web page in a browser, processing the information locally using a transformation operation to transform the information to a transformed result (e.g., hash using a salt), forwarding the transformed result to a remote computer system storing secure data, determining that the transformed result matches the stored secure data, and performing a protective action in response to the determining that the transformed result matches the stored secure data.

20 Claims, 7 Drawing Sheets

(56) References Cited

U.S. PATENT DOCUMENTS

| | | |
|---|---|---|
| 2005/0091530 A1 | 4/2005 | Avraham |
| 2011/0088085 A1 | 4/2011 | Novak |
| 2011/0296509 A1* | 12/2011 | Todorov ................ H04L 9/3271 |
| | | 726/7 |
| 2012/0124671 A1 | 5/2012 | Fritzson |
| 2013/0086695 A1* | 4/2013 | Lakshminarayanan ...................... |
| | | G06F 21/31 |
| | | 726/28 |
| 2013/0301830 A1 | 11/2013 | Bar-El et al. |
| 2014/0282935 A1 | 9/2014 | Lal et al. |
| 2014/0317686 A1 | 10/2014 | Vetillard |
| 2016/0080356 A1 | 7/2016 | Chougle |
| 2016/0057167 A1 | 11/2016 | Bach |
| 2017/0187697 A1 | 6/2017 | Li |
| 2017/0317828 A1 | 11/2017 | Reinhold |
| 2019/0020646 A1* | 1/2019 | Magyar ................ H04L 9/0643 |

OTHER PUBLICATIONS

European Search Report dated Dec. 11, 2019, European Patent Application No. 19196544.1.

* cited by examiner

| Field | Description |
|---|---|
| activated-at | Date and time at which the user's status was set to active. |
| comment | Notes entered about user. |
| created-at | date and time at which identity was created. |
| custom_attributes | Provides a list of custom attribute fields. |
| directory-id | ID of the directory (Active Directory, LDAP, for example) from which the user was created. |
| distinguished-name | Synchronized from Active Directory. |
| email | User's email address, which is also used to log in to Access Management System. |
| external_ID | External ID that can be used to uniquely identify the user in another system. |
| first_name | User's first name. |
| last_name | User's last name. |
| userID | Unique ID for user within Access Management System. |
| groupID | Group to which the user belongs. |
| invalid_login_attempts | Number of sequential invalid login attempts the user has made that is less than or equal to the Maximum invalid login attempts. When this number reaches this value, the user account will be locked for the amount of time defined by the Lock effective period. |
| last-login | Date and time of the user's last login. |
| locale | Represents a geographical, political, or cultural region. Some features may use the locale value to tailor the display of information, such as numbers, for the user based on locale-specific customs and conventions. |
| locked-until | Date and time at which the user's account will be unlocked. |
| manager_ID | ID of the user's manager. |
| password_changed | Date and time at which the user's password was last changed. |
| phone | User's telephone number. |
| role | Rile IDs to which the user is assigned. |
| state | Represents the user's stage in a process (such as user account approval). User state determines the possible statuses a user account can be in. States include: Unapproved, Approved, Rejected and Unlicensed. |
| status | The status of a user's account with the Access Management System. Possible values include Unactivated, Active, Suspended, Locked, Password expired, Awaiting password reset, Password Pending, and Security Question Required. |
| updated-at | Date and time at which the user's information was last updated. |
| username | If the user's directory is set to authenticate using a user name value, this is the value used to sign in. |
| password hash | A hash of the user's password. |
| salt | Random value used to created password hash. |

Figure 3

SECURE DATA LEAK DETECTION

BACKGROUND

Network resources are anything that can be accessed via a network. Examples of network resources include websites accessible via the Internet (or other network), software running on a computer that is connected to a network, software as a service (SAAS), and hardware devices that can be communicated with via a network. Often, the network resource needs to be protected by restricting access to authorized users.

Because it is typical for some users to access many network resources over a period of time, access management systems can be put in place to manage and restrict access to one or multiple network resources. In general, access management is the service of identifying, tracking, controlling and managing authorized users' access to a network resource. It is a broad concept that encompasses policies, processes, methodologies and tools to maintain access privileges within an IT environment. Access management services can include managing identities and managing access to network resources for those identities.

A typical access management system requires a user to authenticate, which is the process of a user asserting its identity (e.g., the user is stating who they are) and confirming the user's identity (proving that the user is who they say they are). Once a user is authenticated, an access management system can use various rules and policies to determine which network resources the user is allowed to access.

Users typically authenticate themselves by presenting security credentials. For example, many systems require a use to provide a username and password before the user's computer is authorized to access a network resource.

Hackers often attempt to illicitly obtain a computer user's security credentials (e.g. username and/or password) to gain access to the user's computer or network resources in a manner that is difficult to trace back to the hacker. For example, a hacker may wish to access a user's email account to send out spam email or access databases of the user's employer to access competitive information, customer information or other sensitive data. One method for a hacker to obtain a user's security credentials is a process called phishing. Phishing is the fraudulent attempt to obtain secure data such as usernames, passwords, credit card details, and other personal or business information for malicious reasons by disguising as a trustworthy entity in an electronic communication. Phishing is typically carried out by email spoofing, and it often directs users to enter personal information at a fake website, the look and feel of which is identical to the legitimate site, the only difference being the URL. Communications purporting to be from social web sites, auction sites, banks, online payment processors or IT administrators are used to lure victims. The communications often contain some ruse (such as needing to reset the user's account after a problem has occurred) to trick the user into giving his or her password (or other security credentials) to the hacker. For example, the user may be tricked into divulging his or her password to the hacker through a communication such as an e-mail directing the user to an authentic looking website with a login form that submits the password to the hacker instead of to the owner of the network resource.

Phishing not only inconveniences and harms the direct victims, but also may cause an owner of a network resource or access management system to incur significant costs. The owner of the network resource or the access management system may need to spend time and money restoring hacked user accounts (e.g., reset the password and delete thief-created subaccounts). The owner also may incur operational costs resulting from the fraudulent usage of accounts. The owner of the network resources may incur expenses due to loss of sensitive business information (e.g., competitive information, customer information or other sensitive data).

Access management systems typically implement strong security measures to protect passwords and other user credentials. However, a hacker can use the phishing techniques described above to fool a user to think that they are providing their password to one of the network resources. Once that happens, the hacker now has the user's password to the access management system and can access many of the network resources protected and/or managed by the access management system.

Additionally, users may re-use their passwords for other web sites that are less secure than an access management system. It may be easier for a hacker to break into these other web sites and steal passwords. If the user of an access management system does re-use their access management system password for logging into other web sites, a hacker who breaks into the other web site will then have a means for gaining access to the access management system and its protected network resources. Therefore, it is desirable for a user of an access management system to not re-use their access management system password for logging into other web sites.

Therefore, there is a need to make sure that passwords (and/or other secure data) are not leaked to unwanted entities. This need is not restricted to protecting access management systems, as other system will have the same need.

BRIEF DESCRIPTION OF THE DRAWINGS

Like-numbered elements refer to common components in the different figures.

FIG. 2 is a table that depicts an example set of fields for an identity record.

DETAILED DESCRIPTION

Technology is proposed to detect whether passwords used for access management systems or other IT/data processing systems are not leaked to other systems (which are likely to be less secure) or to hackers. While many of the examples described below are focused detecting whether passwords are leaked, the proposed technology can also be used to detect whether other secure data has been leaked.

One embodiment of the proposed technology for detecting leaks of secure data (e.g., passwords) includes a browser extension (or other software) identifying information (e.g., a password) input to a web page in a browser (or in another manner), processing the information locally using a transformation operation to transform the information to a transformed result (e.g., hash using a salt), forwarding the transformed result to a remote computer system storing secure data, determining that the transformed result matches the stored secure data, and performing a protective action in response to the determining that the transformed result matches the stored secure data. In one embodiment, the performing the protective action comprises the browser extension (or other software) preventing the information input to the web page from being submitted to a server for the web page. Alternatively, or in addition, the performing the protective action comprises locking a user account associated with the stored secure data (e.g., a user account in an access management system) so that the user account cannot be used to access the network resource (or any other resource protected and/or managed by the access management system).

Figure 1:
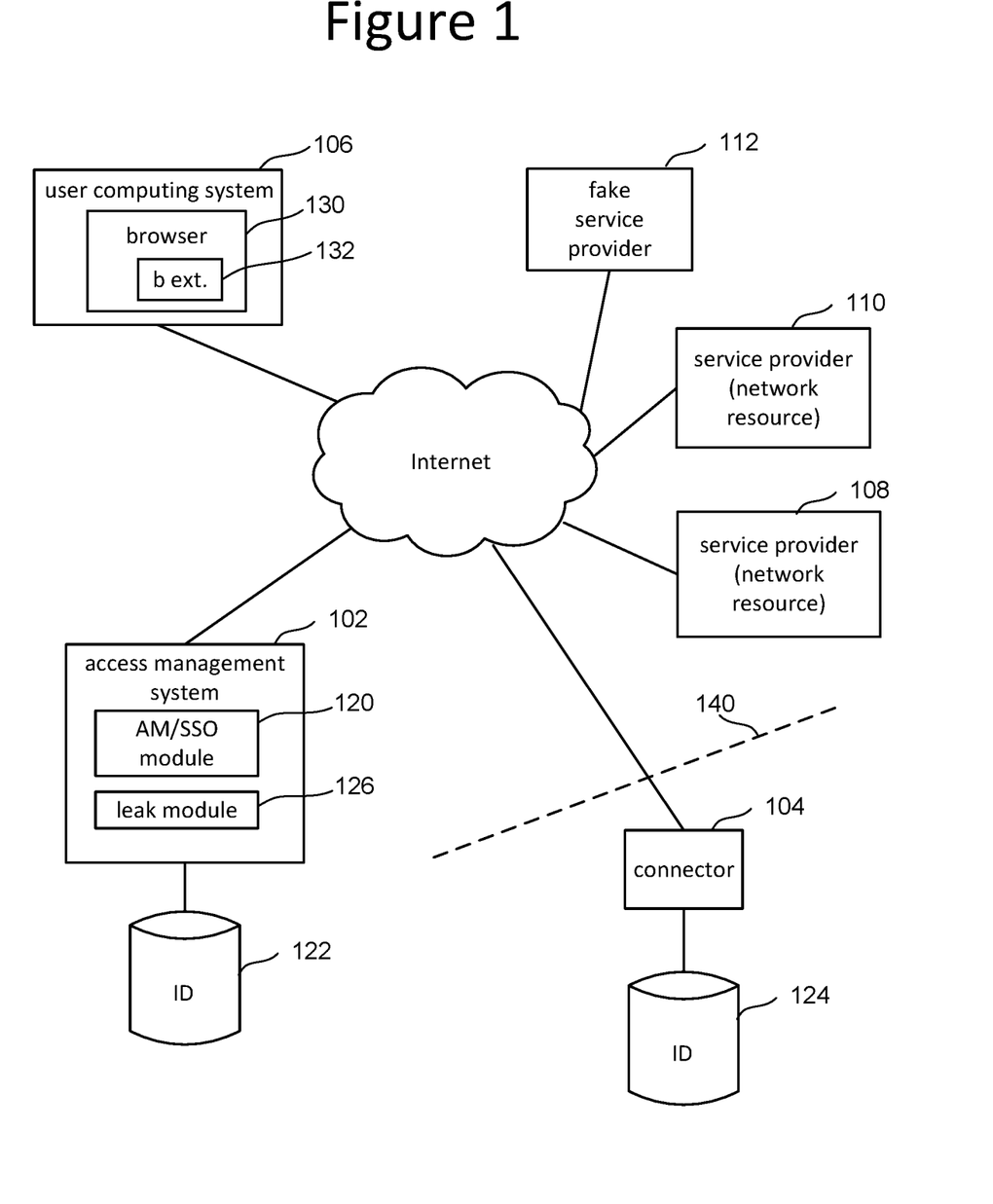
FIG. 1 is a block diagram of a IT/data processing system that implements the technology proposed herein.

FIG. 1 is a block diagram of a IT/data processing system that implements the technology proposed herein for detecting whether passwords or other secure data has been leaked. FIG. 1 depicts an access management system 102, connector 104, first computing system 106, service provider 108, service provider 110 and fake service provider 112 all connected to the Internet via zero, one or more local area networks (or other types of networks). Access management system 102 includes one or multiple servers (or other types of computers) that perform access management services. In one embodiment, access management system 102 includes AM/SSO module 108, which is software running on the one or multiple servers that perform access management services. Each of those servers includes a communication interface (e.g., WiFi or wired Ethernet), local memory, solid state drive ("SSD") or hard disk drive, user interface and a processor (one or multi-core), all of which are connected to each other. The processor is configured (e.g., programmed) to perform the processes described below by executing processor readable code stored on a non-transitory processor readable storage medium.

Access management system 102 includes an identity data store 122 that stores identify information for the identities managed by Access management system 102. Identity data store 122 can be connected to or otherwise in communication with any one or more of the severs that constitute access management system 102. Identity data store 122 can also be incorporated within one of those servers. Access management system 102 uses a set of rules and policies to determine whether the managed identities can access network resources. In one embodiment, each of the identities managed by access management system 102 includes an identity record that comprises a set of fields of data. FIG. 2 is a table that depicts an example set of fields for an identity record stored in identity data store 122.

In some embodiments, an organization that uses access management system 102 maintains its own identity data store 124. One example of identity data store 124 implements Active Directory, which is a directory service developed for Windows domain type networks. Active Directory allows management and storage of information using Lightweight Directory Access Protocol ("LDAP"). As a directory service, an Active Directory instance consists of a database and corresponding executable code responsible for servicing requests and maintaining the database. Objects in Active Directory databases can be accessed via LDAP. Each object represents a single entity, such as a user. An object is uniquely identified by its name and has a set of attributes— the characteristics and information that the object represents—defined by a schema, which also determines the kinds of objects that can be stored in Active Directory. LDAP is an open, vendor-neutral, industry standard application protocol for accessing and maintaining distributed directory information services over an Internet Protocol (IP) network. A common use of LDAP is to provide a central place to store usernames, passwords and other associated attributes. This allows many different applications and services to connect to the LDAP server to validate users.

Access management system 102 includes leak module 126, which is software running on the one or multiple servers of access management system 102 that performs the detecting of leaks of secure data (including passwords), as described herein. This software resides on a non-transitory processor readable storage medium (e.g., hard disk drive, SSD, memory) and program one or more processors to perform the processes described herein.

Connector 104 includes software running on a computer that is communication with identity data store 124, identity data store 122 and access management system 102. Connector 104 synchronizes the data in identity data store 124 with the data in identity data store 122. In one embodiment, identity data store 124 and identity data store 122 store the same identity records in similar formats. In one embodiment, identity store 124 and connector 104 are behind a firewall 140. Thus, connector 104 provides an outbound tunnel for access management system 102 to enable identity data store 122 (outside the firewall) to synchronize (including synchronizing passwords) with identity store 124 behind the firewall.

Identity data store 124 stores users passwords. Therefore, in one embodiment connector 104 synchronizes the users passwords in identity data store 124 with identity data store 122. Therefore, both data stores will have copies of the users passwords. In another embodiment, identity data store 122 does not store the users passwords. Instead, identity data store 122 creates a hash of each users password using a cryptographic hash function and stores that hash rather than the clear text password. A cryptographic hash function is a special class of hash function that has certain properties which make it suitable for use in cryptography. It is a mathematical algorithm that maps data of arbitrary size to a bit string of a fixed size (a hash) and is designed to be a one-way function, that is, a function which is infeasible to invert. The only way to recreate the input data from an ideal cryptographic hash function's output is to attempt a brute-force search of possible inputs to see if they produce a match, or use a rainbow table of matched hashes. Password verification commonly relies on cryptographic hashes. Storing all user passwords as clear text can result in a massive security breach if the password file is compromised. One way to reduce this danger is to only store the hash of each password. To authenticate a user, the password presented by the user is hashed and compared with the stored hash.

One example of a suitable hashing function is bcrypt, which is based on the Blowfish cipher and adapts over time. In some embodiments, the hashing function used (such as bcrypt) uses a salt to create the hash of the input data. In cryptography, a salt is random data that is used as an additional input to a one-way function that "hashes" data. In some embodiments, a new salt is randomly generated for each password (or other secure data). In a typical setting, the salt and the password (or other secure data) are concatenated and processed with the cryptographic hash function (e.g., bcrypt), and the resulting output (but not the original password) is stored with the salt in a database (e.g., identity store 122). Hashing allows for later authentication without keeping and therefore risking the plain text password in the event that the authentication data store is compromised. For example, FIG. 2 shows that an identity record in identity data store 122 stores a "password hash" and a "salt."

Service providers 108 and 110 are each a set of one or more servers (or other types of computers) that provide a network resource or access to a network resource. For example, service providers 108 and 110 can provide software as a service; be a portal that provides access to a service or data store; be a web site; a data store, etc. Service providers 108 and 110 are connected to the Internet (directly or via intervening networks). In one example implementation, service providers 108 and 110 can be accessed using HTTP. As will be discussed in more detail below with respect to FIG. 3, in one embodiment, access to service providers 108 and 110 is managed by access management system 102.

User computing system 106 is operated by a user to access a network resource and perform other activities on the Internet (or other network). User computing system 106 can be a desktop computer, laptop computer, smartphone, tablet, smart watch, smart appliance or other type of computer or computing system. User computing system 106 includes a communication interface (e.g., WiFi or wired Ethernet), local memory, SSD or hard disk drive, user interface and a processor (one or multi-core), all of which are connected to each other. The processor is configured (e.g., programmed) to perform the processes described below by executing processor readable code stored on a non-transitory processor readable storage medium.

User computing system 106 includes a browser 130, which is a standard web browser known in the art that is used to browse the Internet (or other networks or a computing device). Examples of browsers are Firefox, Safari, Chrome, Internet Explorer and Edge. Other browsers can also be used.

User computing system 106 also includes a browser extension 132. A browser extension is a software plug-in that extends the functionality of a browser. Some extensions are authored using web technologies such as HTML, JavaScript, and CSS. Others are developed using machine code and application programming interfaces (APIs) provided by web browsers, such as NPAPI and PPAPI. Browser extensions can change the user interface of the web browser without directly affecting viewable content of a web page; for example, by adding a browser toolbar.

In computing, a plug-in is a software component that adds a specific feature to an existing computer program. When a program supports plug-ins, it enables customization. The common examples are the plug-ins used in browsers to add new features such as search-engines, virus scanners, or the ability to use a new file type such as a new video format. Therefore, browser extension 132 is a software component that adds a specific feature to a browser.

Browser extension 132 can use an API of browser 130 so that browser extension 132 is notified by browser 130 when the user navigates to a new page. The notification to browser extension 132 can be provided before the new page is loaded or after the new page is loaded. Additionally, after the new page is identified to browser extension 132 and browser extension 132 can block loading of the new page. Browser extension 132 can also inject content into the browser.

Browser extension 132 can use the API of browser 130 so that browser extension 132 is notified by browser 130 when the user attempts to submit a page or form, or navigate to a new page. The notification to browser extension 132 can be provided before the page or form is submitted, and browser extension 132 can block (prevent) submission of the page or form.

Fake service provider 112 includes one or more servers, connected to the Internet, that are provided by a hacker or other entity with bad intent. For example, fake service provider 112 may be involved in phishing that includes sending an email to the user of user computing system 106 with a link to a fake web page on fake service provider 112. The fake web page may be impersonating a real network resource and, thus, have the look and feel of which is identical to the legitimate site, the only difference being the URL. When the user accesses the fake web site, the user will be provided with a login from to enter the user's username and password. This will allow the owner of fake service provider 112 to steal the user's password. The technology described herein provides a mechanism to detect whether a password used for access management system 102 (or other secure data) has been leaked to fake service provider 112.

Additionally, the technology described can also be used to detect whether a password used for access management system 102 (or other secure data) has been leaked to a legitimate web site or service provider not associated with access management system 102. For example, a user may try to reuse passwords. However, using the password for access management system 102 with another web site or service provider may be a security risk.

User computing system 106 can be operated by a user for which there is a user identity record stored in identity data store 122. The user can operate user computing system 106 to access the network resources of service providers 108 and 110 via access management system 102. In one embodiment, the access management services provided by AM/SO module 120 of access management system 102 include Single Sign-On service ("SSO"), which allows a user to authenticate once with access management system 102 and then be provided access to multiple authorized network resources managed by access management system 102.

In one embodiment, SSO is implemented using Security Assertion Markup Language ("SAML"), which is an open standard for exchanging authentication and authorization data between parties, in particular, between an identity provider (e.g., access management system 102) and a service provider (e.g., service providers 108 and 110). SAML is an XML-based markup language for security assertions (statements that service providers use to make access-control decisions).

A SAML assertion contains a packet of security information:

<saml:Assertion ...>
..
</saml:Assertion>

SAML assertions are usually transferred from identity providers to service providers. Assertions contain statements that service providers use to make access-control decisions. Three types of statements are provided by SAML:
1. Authentication statements
2. Attribute statements
3. Authorization decision statements Authentication statements assert to the service provider that the principal did indeed authenticate with the identity provider at a particular time using a particular method of authentication. Other information about the authenticated principal (called the authentication context) may be disclosed in an authentication statement. An attribute statement asserts that a subject is associated with certain attributes. An attribute is simply a name-value pair. Relying parties use attributes to make access-control decisions. An authorization decision statement asserts that a subject is permitted to perform action A on resource R given evidence E.

Figure 3:
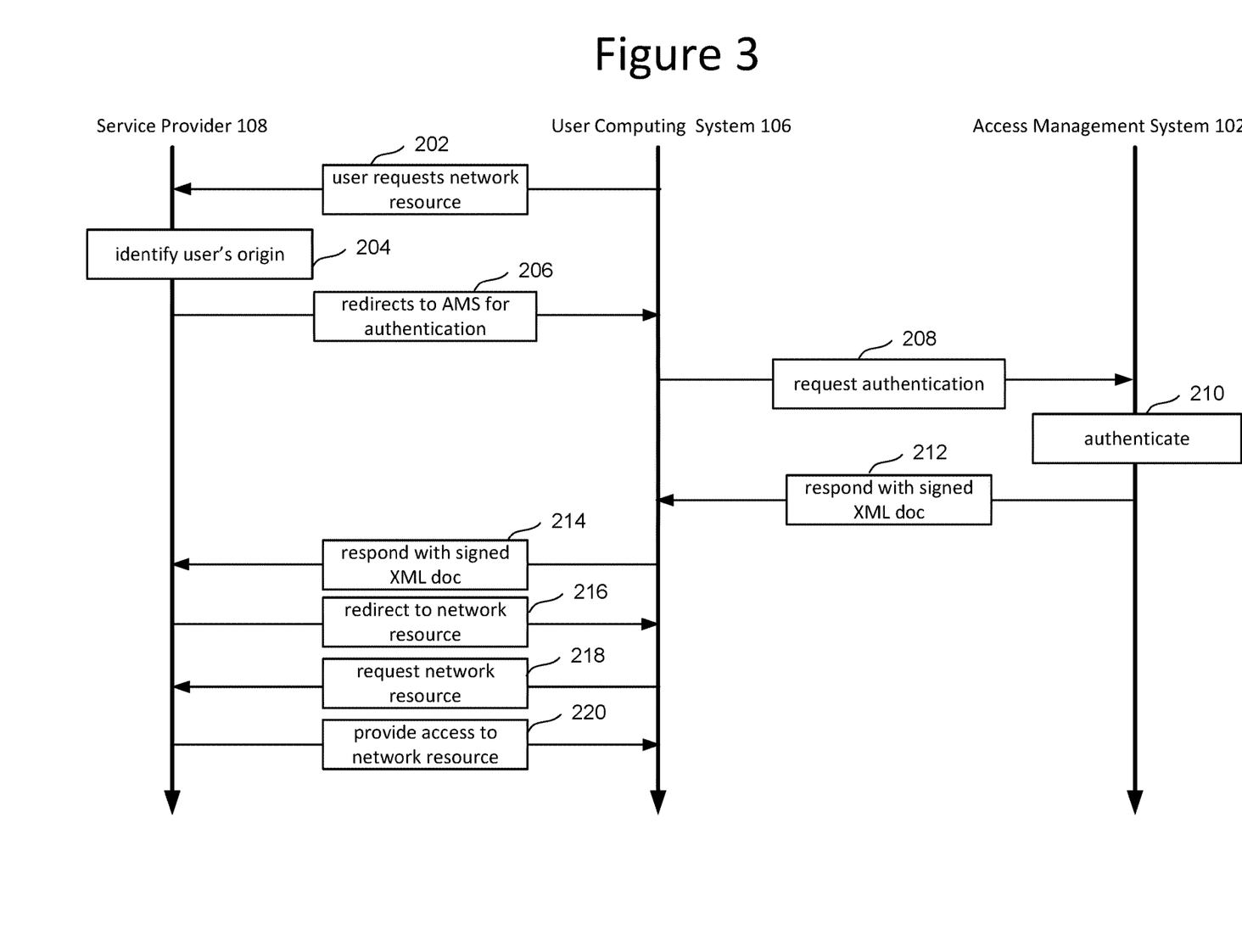
FIG. 3 is a process flow diagram describing access management services.

FIG. 3 is a process flow diagram describing access management services using SAML, including user computing system 106 gaining access to a network resource of service provider 108 via access management system 102 (which provides SSO). In the example flow of FIG. 3, SAML is used starting with step 208. The depicted exchanges are front-channel exchanges, that is, an HTTP user agent (e.g., browser 130) communicates with a SAML entity. Front-channel exchanges lead to simple protocol flows where all messages are passed by value using a simple HTTP binding (GET or POST). Alternatively, for increased security or privacy, messages may be passed by reference. For example, an identity provider may supply a reference to a SAML assertion (called an artifact) instead of transmitting the assertion directly through the user agent. Subsequently, the service provider requests the actual assertion via a back channel. Such a back-channel exchange is specified as a SOAP message exchange (SAML over SOAP over HTTP). In general, a SAML exchange over a secure back channel is conducted as a SOAP message exchange. The use of SOAP as a binding mechanism is optional, however, as a given SAML deployment can choose whatever bindings are appropriate.

In step 202, user computing system 202 sends a request (e.g., HTTP) to service provider 108 for access to the network resource. This could be in the form of the user clicking a link, clicking a bookmark, typing an address or typing URL in browser 130. Upon receipt of the request, service provider 108 identifies the user's origin in step 204. For example, service provider 108 may discover the user's IP address, application subdomain, or similar. Based on the user's origin, service provider determines that the user is associated with access management system 102 and in step 206 service provider 108 redirects user computing system 106 to access management system 102.

In step 208, user computing system 106 sends a request to access management system 102 for authentication (e.g., including SSO). This requests identifies the network resource for which access is sought. In step 210, access management system 102 performs the necessary authentication, if needed. More details of step 210 are provided by the flow chart of FIG. 4. As part of successfully authenticating the user of user computing system 202, access management system 102 creates an XML document that is securely signed with an X.509 certificate (e.g., private key), as described below. In step 212, access management system 102 sends the signed XML document in a response to user computing system 106. In step 214, user computing system 106 posts the signed XML document to service provider 108.

Service provider 108 already knows access management system 102 and has a X.509 certificate fingerprint. Service provider 108 uses its X.509 certificate fingerprint (e.g., public key) to validate the signature. Once the signature is validated, service provider 108 trusts that the user associated with the user ID in the signed XML document is properly authenticated and authorized to access the network resource. Therefore, in step 216 service provider 108 creates a security context at service provider 108 and redirects user computing system 106 to the network resource. In step 218, user computing system 106 uses the URL from the redirection of step 216 to request access to the target network resource. Since the security context exists, in step 220 service provider 108 returns the resource to user computing system 106.

Figure 4:
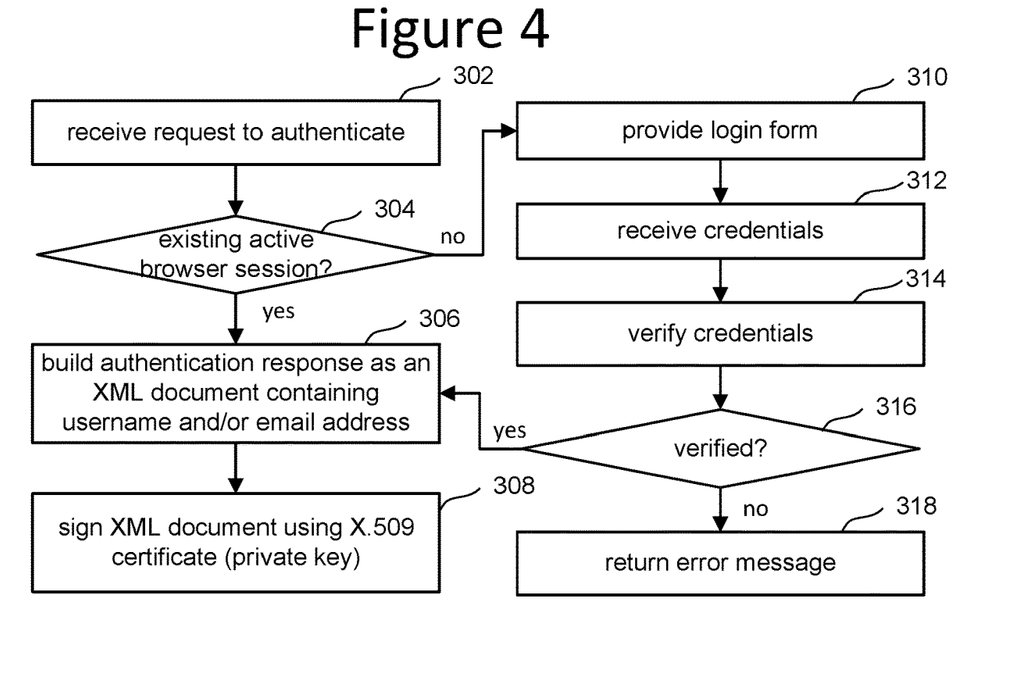
FIG. 4 is a flow chart describing one embodiment of a process for authenticating.

FIG. 4 is a flow chart describing one embodiment of a process for authenticating. The process of FIG. 4 is one example implementation of step 210 of FIG. 3, and is performed by access management system 102. In step 302, access management system 102 receives the request to authenticate from user computer system 106 (see step 208 of FIG. 3). The user either has an existing active browser session with access management system 102 or establishes one (step 304). If the user has an existing active browser session with access management system 102 then in step 306 access management system 106 builds an authentication response as an XML document that contains the username, userID and/or user's email address. In one embodiment, the XML document generated in step 306 does not include the user's password, the hash of the user's password or any other representation of the user's password. In step 308, access management system 102 signs the XML document using an X.509 certificate (e.g., private key).

If (step 304) the user does not have an existing active browser session with access management system 102 then in step 310 access management system 102 provides a login form. In step 312, access management system 102 receives the credentials entered by the user. For example, the form may request a username and password. In step 314, access management system 102 verifies that the received credentials (e.g., username and password) match the credentials stored in identity data store 122 or identity data store 124. In one embodiment, access management system 102 obtains the salt for the username and creates a hash of the password using bcrypt. That hash is then compared to the hash stored in identity data store 122 for the username to see if they match. If they match, the credentials are verified (step 316) and the user is authenticated. An active browser session is created at browser 130, and the process continues at step 306. If the newly created hash does not match the hash stored in identity data store 122 (step 316), then an error message is returned in step 318 (e.g., user is denied access to network resource). Although the above example described matching a username and password, other credentials can also be used to authenticate.

Figure 5:
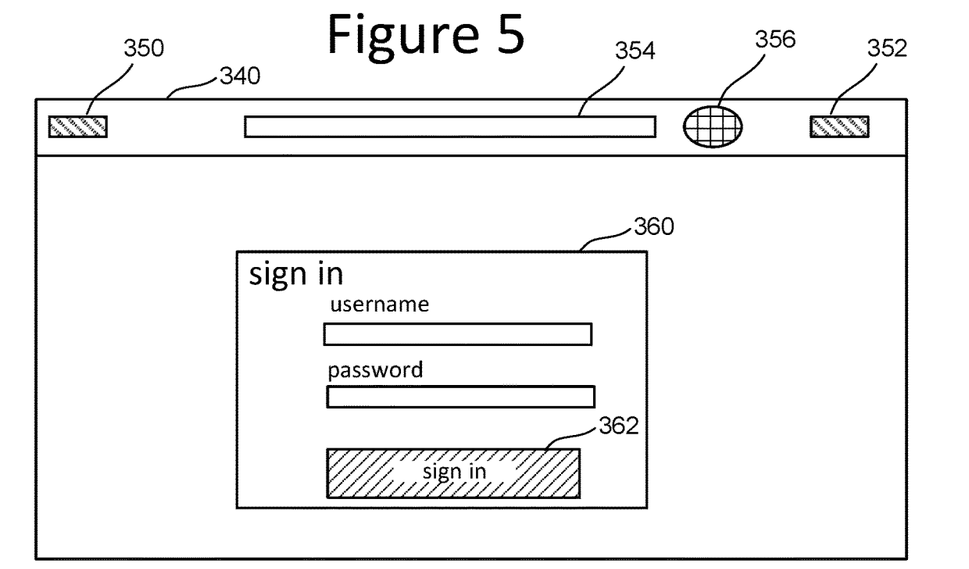
FIG. 5 depicts a browser window displaying a login form.

FIG. 5 depicts a browser window 340 provided by browser 130 on user computing system 106. Browser window 340 includes control items 350 and 352, which can include a forward button, back button, reload button, home button, bookmarks menu, favorites menu, print button, save as button, etc. Browser window 340 also includes field 354 for entering a URL or an IP address. Browser window 340 also includes an icon 356, which serves as a graphical indication of browser extension 132. In one embodiment, icon 356 serves as a button so that when the user clicks on icon 356 browser extension 132 is activated to perform a function. Browser window 340 displays login form 360 that is presented to the user of user computer system 106 during step 310 of FIG. 4. The login form is generated by access management system 102 and sent to browser 130 on user computer system 106. The login form includes a field to enter a username, a field to enter a password, and a button 362 (labeled "sign in"). A user can type in the user's username, type in the user's password, and then click on button 362 to submit the user's login credentials.

Figure 6:
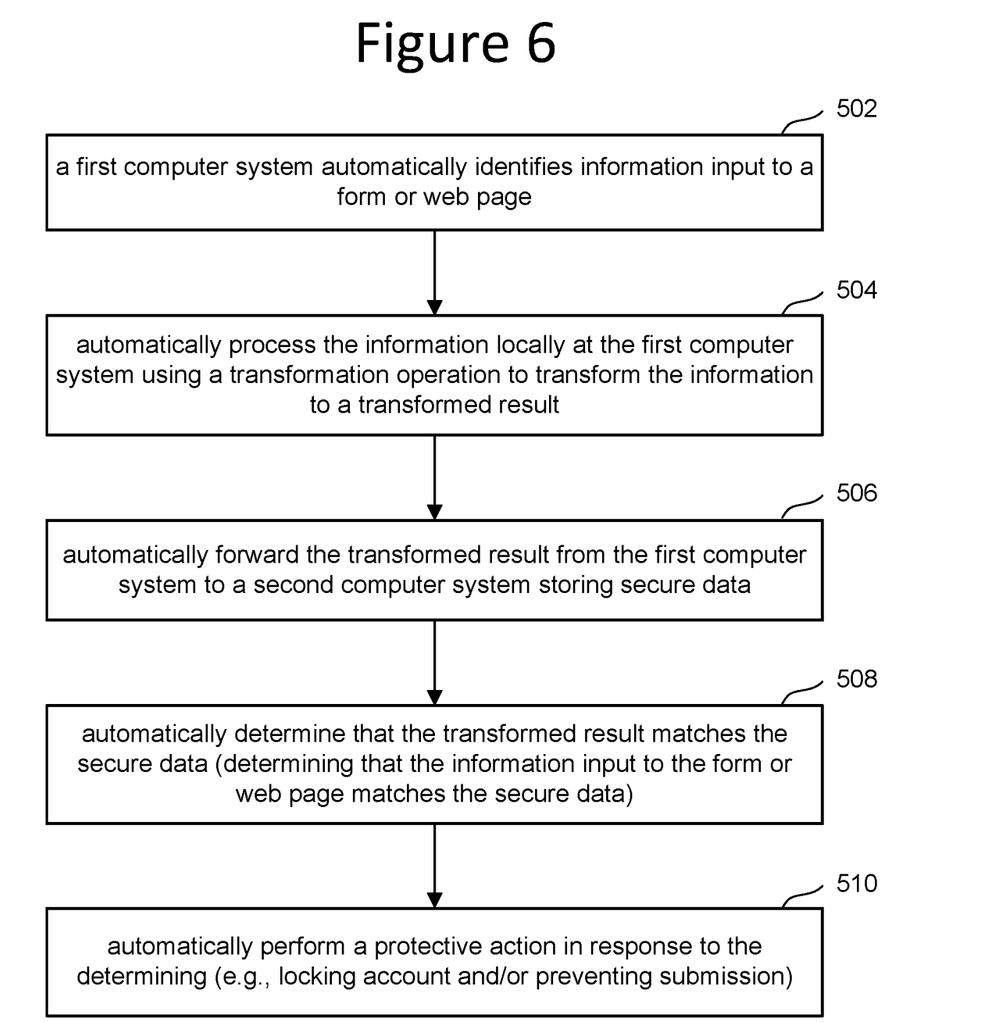
FIG. 6 is a flow chart describing one embodiment of a process for detecting leaks of secure data.

As described above, the technology described herein provides a mechanism to detect whether a password used for access management system 102 (or other secure data) has been leaked to fake provider 112 or another entity. FIG. 6 is a flowchart describing one embodiment of a process for detecting such leaks of secure data. In step 502 of FIG. 6, a first computer system automatically identifies information input to a form or a web page. For example, browser extension 132 (or other software) on user computing system 106 identifies that a user has entered a password into a password field of a form, entered credit card information into a form, or provided other confidential/personal information. It step 504, the information that was identified in step 502 is automatically processed locally at the first computer system using a transformation operation to transform the information to a transformed result. Many different transformation operations can be performed. In one embodiment, the transformation operation includes combining the information identified in step 502 with a randomly generated value. For example, as discussed above, a password (or other secure data) and a salt can be concatenated and processed with a cryptographic hash function (e.g., bcrypt). In step 506, that transformed result is automatically forwarded from the first computer system to a second computer system. In one embodiment, the second computer system is remote from the first computer system. The second computer system stores secure data. In some of the examples above, the second computing system is the access management system 102. In step 508, the transformed result is compared to the secure data and it is determined that the transformed result matches the secure data. That is, it is determined that the information input to the form or web page (step 502) matches the secure data stored on the second computer system. In step 510, one or more protective actions are automatically performed in response to determining that the transformed result matches the secure data. Examples of a protective actions include locking a user's account with access management system 102 (or another computer system), alerting the user of the leak of secure information, alerting an IT professional managing a computer system, blocking submission of the form or web page that the user entered the password into.

In one embodiment of the process of FIG. 6, the system also performs access management services (see e.g., FIG. 3) for one or more network resources using access management system 102. The access management system maintains a plurality of user accounts for accessing the network resources. Each of the user accounts includes a user identification. The user account associated with the information that was input to the form or web page (see step 502) can be automatically locked as part of the one or more protective actions performed in step 510 so that the user account cannot be used to access the network resources protected and managed by access management system 102.

Figure 7A:
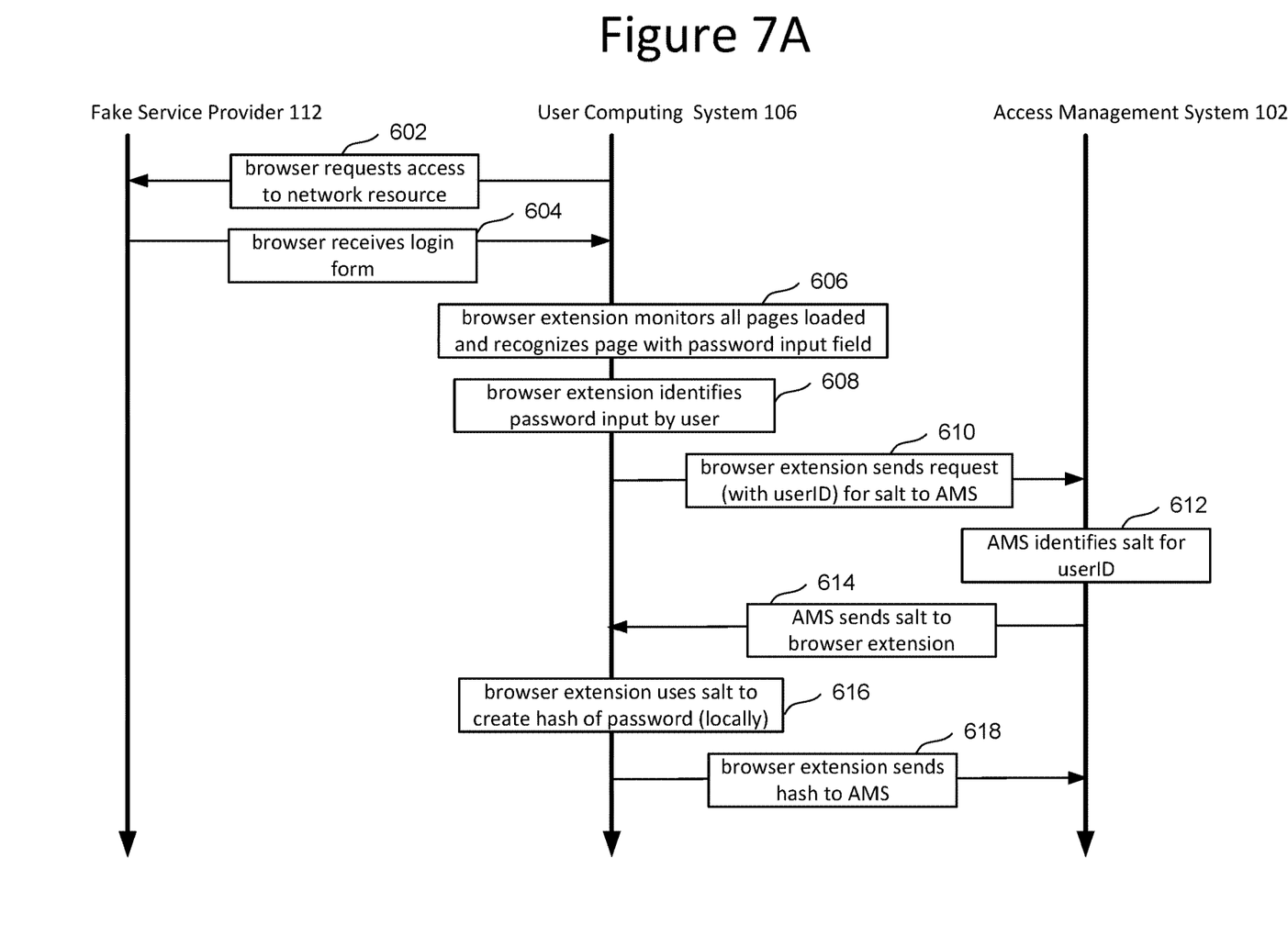
FIGS. 7A and 7B together are a process flow diagram describing one embodiment of a process for detecting leaks of secure data.
Figure 7B:
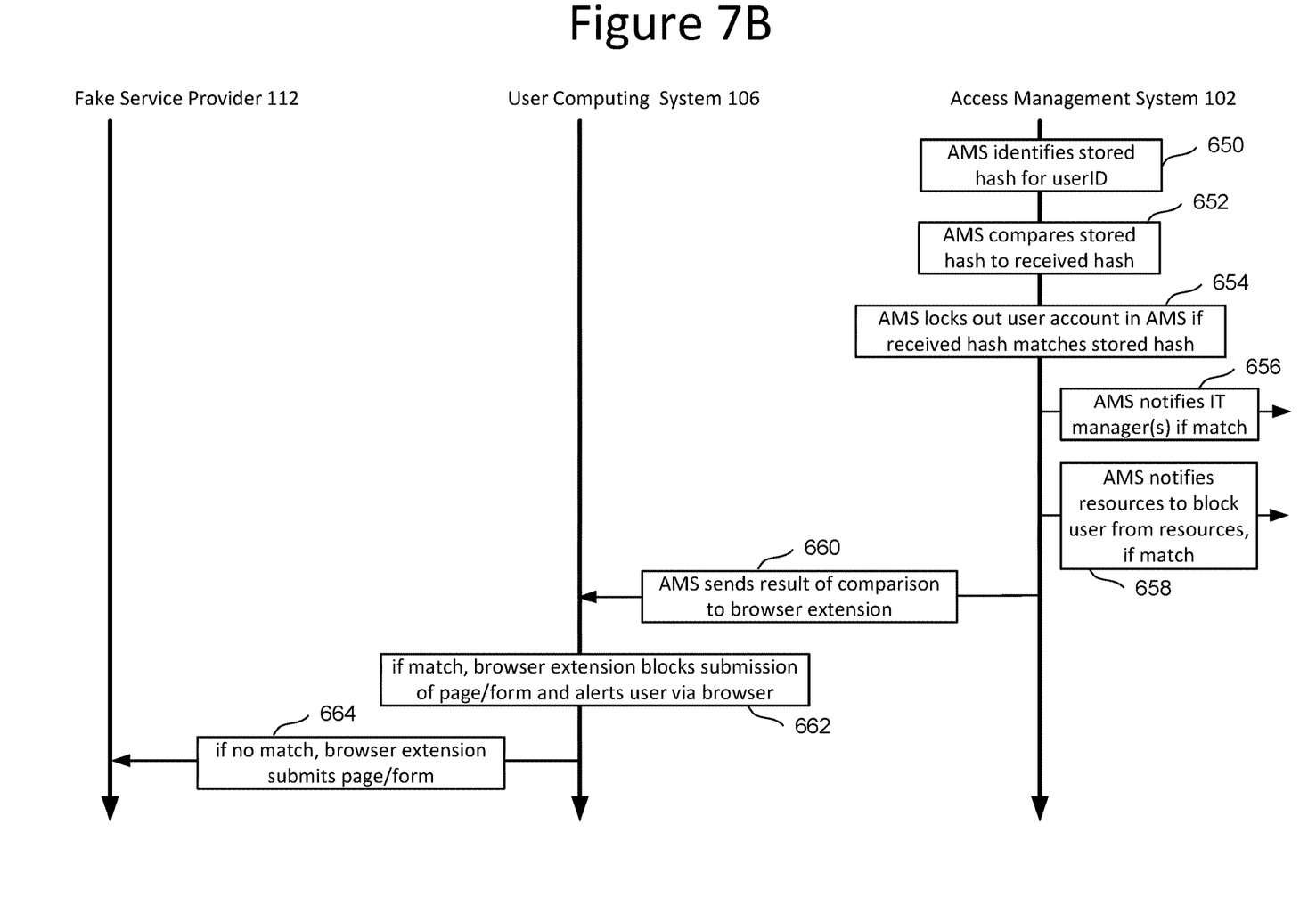

FIGS. 7A and 7B together depict a process flow diagram describing one embodiment of a process of detecting leaks of secure data. The process of FIGS. 7A and 7B represent further details of one example implementation of the process of FIG. 6. In step 602, browser 130 requests access to a network resource (unprotected by access management system 102 or a fake network resource from fake service provider 112). In step 604, browser 130 receives a login form. For example, login form 360 of FIG. 5 can be presented to a user via browser 130 from fake service provider 112. Browser extension 132 has been configured (e.g., using an API of browser 130) to be notified of all pages loaded into browser 130. Thus, browser extension 132 monitors all pages loaded into browser 130 (step 606). Browser extension 132 automatically recognizes that the page loaded has a password input field.

Many web pages are created using HTML. One of the elements of HTML is an input tag. The <input> tag specifies an input field where the user can enter data. <input> elements are used within a <form> element to declare input controls that allow users to input data. An input field can vary in many ways, depending on the type attribute. There are different types of <input> tags. One example of an <input> tag is an <input> tag of type "password" which provides a way for the user to securely enter a password. The element is presented as a one-line plain text editor control in which the text is obscured so that it cannot be read, usually by replacing each character with a symbol such as the asterisk ("*") or a dot ("•"). Specifics of how the entry process works may vary by browser, OS and/or user agent.

Below is HTML code for a form, similar in appearance to login form 360 of FIG. 5:

```
<fieldset>
    <legend>sign in</legend>
    <div>
        <label for="userName">Username:</label>
        <input type="text" id="username" name="username"
           required />
    </div>
    <div>
        <label for="password">Password:</label>
        <input type="password" id="password" name="password"
           minlength="8" required
           placeholder="8 characters minimum" />
    </div>
    <input type="submit" value="Sign in">
</fieldset>
```

In the above sample HTML code, there is an input field with <input type="password">. In one embodiment of step 606 of FIG. 7A, browser extension 132 looks for <input type="password"> in the HTML code.

In step 608, browser extension 132 identifies the password (or other information) input by the user into the form (or web page) displayed in browser 130 on user computing system 106. The embodiment of FIG. 7A is directed for detecting leaks of passwords. However, this technology can be used to detect leaks of other secure data. Browser extension 132 can be configured (via an API of browser 130) to be notified before any form is submitted by browser 130. Thus, browser extension 132 has the opportunity to identify any data input by the user before that form is submitted. As discussed above, a user of user computing system 106 authenticates with access management system 102, thereby, creating an active browser session with browser 130 and browser extension 132. Therefore, browser extension 132 is aware of the userID for the user using user computer 106 and browser 130. In step 610, browser extension 132 sends a request for a salt to access management system 102. That request includes the userID identified by browser extension 132 as part of the active browser session. In step 612, access management system 102 identifies the salt for the userID received in 610. For example, access management system 102 uses the userID to access the correct identity record (see FIG. 2) in order to access the salt for that identity record. In step 614, access management system 102 sends that salt to browser extension 132.

In step 616, browser extension 132 uses the salt it received (see step 614) to create a hash of the password. Step 616 is performed locally at user computer system 106 by browser extension 132 (or other software). In one embodiment, the salt and the password are concatenated and processed with the bcrypt cryptographic hash function to create the hash. In other embodiments, other functions and means for using a salt (or other random value) to create a hash (or other transformed result) can be used. Step 616 is one example of processing the information input to the computer based form using a transformation operation to transform that information to a transformed result (e.g., hash). In step 618, browser extension 132 sends the hash (the result of step 616) to access management system 102 (e.g. a remote computer system storing secure data). Sending the hash of the password is more secure than sending the password between the user computing system 106 and access management system 102. If the hash is intercepted by a hacker, it will be extremely difficult or impossible for hacker to figure out the password. On the other hand, if the plain text password is transmitted on the Internet or other network, it may be intercepted and used by a hacker. So the process of creating and sending the transformed result, rather than the secure data, represents an improvement in the operation of the computing system, as the system will be operate more securely and less prone to hackers.

In step 650 of FIG. 7B, access management system 102 identifies the stored hash for the userID. That is, access management system 102 uses the userID to find the identity record (see FIG. 2) in order to access the password hash for that identity record. In step 652, access management system 102 compares the stored password hash from the identity record identified in step 650 to the received password hash (from step 618) to determine if they match. If the two hashes match, then it is concluded that the user leaked the password used for access management system 102. If they don't match, then the user did not leak the password used for access management system 102. In step 654, access management system 102 locks out the user account with access management system 102 (e.g., account associated with the userID) if the received password hash matches the stored password hash. Once the account is locked, the user associated with that locked account will not be able to access any of the network resources protected/managed by access management system 102. In step 656, access management system 102 notifies one or more IT managers of access management system 102 and/or any of the services providers for network resources managed/protected by access management system 102 that there has been a password leak for the userID, if the received hash matches the stored hash. Step 656 and 658 are examples of performing protective actions. In step 658, access management system 102 sends one or more notifications/messages to the network resources (e.g., cloud based applications) protected/managed by access management system 102 to lock out (i.e. block) the accounts with the network resources associated with the userID. Step 658 is performed by user provisioning via an API based on System for Cross-Domain Identity Management (SCIM) or a proprietary protocol over HTTPS.

In step 660, access management system 102 sends the result of the comparison (step 652) to browser extension 132. Step 618 comprised the browser extension 132 sending a message that includes a command to check the password, the userID, and the password hash (result of bcrypt function on the password). In response to that message, access management system 102 sends a result message that indicates a match or no match in step 660. Thus, browser extension 132 receives an indication that the transformed result matches the secure data stored by access management system 102. In step 662, if the passwords match, browser extension 132 blocks submission of the form/page and alerts the user via browser 130. That is, in step 608, browser extension 130 identified that the user entered a password into a form and in step 662 browser extension 132 blocks submission of that form. Additionally, browser extension 132 causes a pop-up a window or other notification to be displayed indicating that the user has attempted to disclose the password to a system outside of access management system 102. If the notification from the access management system received in step 660 indicates that there was not a match, then in step 664 browser extension 132 allows browser 130 to submit the page/form with the password. Note that in the above discussion, browser extension 132 communicates with access management system 102 via the Internet and one or more other networks (e.g. local area networks to connect to the Internet). Steps 654, 656, 658 and 662 are examples of performing protective actions.

The technology proposed herein detects whether passwords used for access management systems or other IT/data processing systems are leaked to other systems (which are likely to be less secure) or to hackers. While many of the examples described above are focused on detecting whether passwords are leaked, the proposed technology can also be used to detect whether other secure data has been leaked. Furthermore, this proposed technology makes the computer system (e.g., access management system) function better because it will be more secure and less prone to hacking. As a result, the computer system will be less costly to operate, the computer system will be more available to authorized users (as hacker will not be diverting computing power or resources), secured information will remain confidential, the network resources will remain available to authorized users, and user will not have down time due to repairing their hacked accounts. The technology described herein is also used to protect the computer system from a leaked password by locking down the account associated with the leak.

One embodiment includes a computer implemented method for secure data leak detection, comprising automatically identifying, at a first computer system, information input to a form; automatically processing the information locally at the first computer system using a transformation operation to transform the information to a transformed result; automatically forwarding the transformed result from the first computer system to a second computer system storing secure data; automatically determining that the transformed result matches the secure data; and performing a protective action in response to the determining.

One embodiment includes a computer implemented method for secure data leak detection, comprising: automatically identifying information input to a web page; automatically determining that the information matches secure data for a user; and automatically locking the user's account for accessing a network resource in response to the determining. One example implementation further comprises identifying a user identification associated with the information; performing access management service for the network resource; and maintaining user accounts for accessing the network resource. The user identification is associated with a first user account for accessing the network resource. The locking the user's account comprises preventing the network resource from being accessed with the first user account.

One embodiment includes a computer implemented method for secure data leak detection, comprising identifying information input to a computer based form; processing the information using a transformation operation to transform the information to a transformed result; forwarding the transformed result to a remote computer system storing secure data; receiving an indication that the transformed result matches the secure data; and performing a protective action in response to the receiving.

One embodiment includes a non-transitory processor readable storage medium that stores processor readable code that is configured to program one or more processors to implement a browser extension. The browser extension performs a method comprising recognizing input of password information in a browser associated with an identity; obtaining a salt associated with the identity from a remote server; creating a hash of the password information using the salt; sending the hash to a remote server; receiving results of an indication that the hash matches a stored password hash for the identity; and performing a protective action in response to the receiving.

One embodiment includes an apparatus comprising a communication interface, a memory and a processor connected to the communication interface and the memory. The processor is configured to recognize input of password information for a user that is authenticated on the apparatus, obtain a salt associated with the user from a remote server, hash the password information using the salt, send the hashed password information to the remote server, receive results of an indication of whether the hashed password information matches a stored hash of a password for the user and performing a protective action if the hashed password information matches the stored hash of the password for the user.

One example implementation further comprises a computing system configured to perform access management service for a network resource. The computing system includes the remote server. The computing system is configured to maintain user accounts for accessing the network resource. The user is associated with a first user account for accessing the network resource. The salt is associated with and unique to the first user account. The computing system is configured to lock the first user account by preventing the network resource from being accessed with the first user account if the hashed password information matches the stored hash of the password for the user.

For purposes of this document, a "computer" is a device for storing and/or processing data. A computer can include a desktop computer, a laptop computer, a server, a smartphone, a smart watch, a smart appliance, and any other machine that stores or processes data.

For purposes of this document, a "form" is a document, page or the like that includes one or more spaces for entering information. A computer based form is a form that is generated and displayed by a computer.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A computer implemented method for secure data leak detection, comprising:
    creating a session between a first computer system and a second computer system based on authenticating with a user identification;
    during the session, automatically identifying, at the first computer system, information input to a form;
    automatically processing the information locally at the first computer system using a transformation operation to transform the information to a transformed result;
    automatically forwarding the transformed result from the first computer system to the second computer system, the second computing system stores secure data associated with the user identification of the session;
    automatically determining that the transformed result matches the secure data that is associated with the user identification of the session and that is stored at the second computing system; and
    performing a protective action in response to the determining that the transformed result matches the secure data associated with the user identification of the session and that is stored at the second computing system.

2. The computer implemented method of claim 1, wherein:
    the using the transformation operation to transform the information comprises combining the information with a randomly generated value.

3. The computer implemented method of claim 1, wherein:
    the using the transformation operation to transform the information comprises hashing the information with a salt.

4. The computer implemented method of claim 1, further comprising:
    during the session between the first computer system and the second computer system, the first computing system requesting from the second computers system a random value previously stored for and associated with the user identification, the first computer system is aware of the user identification based on the session;
    the second computer system using the user identification to identify the random value previously stored for and associated with the user identification; and
    the second computer system sending the random value previously stored for and associated with the user identification to the first computer system, the first computer system uses the random value with transformation operation to transform the information to the transformed result.

5. The computer implemented method of claim 1, further comprising:
during the session between the first computer system and the second computer system, the first computing system requesting from the second computers system a salt previously stored for and associated with the user identification, the first computer system is aware of the user identification based on the session;
the second computer system using the user identification to identify the salt previously stored for and associated with the user identification; and
the second computer system sending the salt previously stored for and associated with the user identification to the first computer system, the using the transformation operation to transform the information comprises hashing the information with the salt.

6. The computer implemented method of claim 1, wherein:
the performing the protective action comprises locking a user account from accessing a network resource, the user account associated with the user identification.

7. The computer implemented method of claim 1, further comprising:
performing access management services for a network resource using the second computer system, the second computer system maintains a plurality of user accounts for accessing the network resource, the user identification is associated with a first user account of the plurality of user accounts, the performing the protective action comprises automatically locking the first user account so that the first user account cannot be used to access the network resource.

8. The computer implemented method of claim 1, wherein:
the automatically identifying comprises a browser extension on the first computer system identifying password information input to a web page in a browser on the first computing system;
the processing the information locally is performed by the browser extension; and
the performing the protective action comprises the browser extension preventing the information input to the web page from being submitted to a server for the web page.

9. The computer implemented method of claim 1, wherein:
the automatically identifying comprises a browser extension on the first computing system automatically identifying a password input field for a web page and identifying password information input to the password input field in a browser on the first computing system; and
the processing the information locally is performed by the browser extension.

10. The computer implemented method of claim 9, further comprising:
during the session between the first computer system and the second computer system, the browser extension requesting from the second computers system a random value previously stored for and associated with the user identification, the browser extension is aware of the user identification based on the session;
the second computer system using the user identification to identify the random value previously stored for and associated with the user identification; and
the second computer system sending the random value previously stored for and associated with the user identification to the browser extension, the using the transformation operation to transform the information comprises the browser extension hashing the information with the random value.

11. A computer implemented method for secure data leak detection, comprising:
a first computing system identifying information input to a computer based form;
the first computing system requesting a random value from a second computer system, the random value is prestored and associated with a user identification at the second computing system;
the first computing system processing the information using a transformation operation with the random value to transform the information to a transformed result;
forwarding the transformed result to the second computer system storing secure data, the secure data is prestored and associated with the user identification at the second computing system;
receiving an indication that the transformed result matches the secure data; and
performing a protective action in response to the receiving the indication that the transformed result matches the secure data.

12. The computer implemented method of claim 11, further comprising:
creating a session between the first computer system and the second computer system based on authenticating with the user identification, the first computer system is aware of the user identification based on the session.

13. The computer implemented method of claim 12, wherein:
the identifying information comprises a browser extension on the first computer system identifying password information input to the web page in a browser on the first computing system; and
the processing the information, identifying the user identification, forwarding, requesting the salt, receiving the salt, receiving the indication and performing the protective action are performed by the browser extension.

14. A non-transitory processor readable storage medium, comprising:
processor readable code that programs one or more processors to implement a browser extension that performs a method comprising:
recognizing input of password information in a browser associated with an identity;
obtaining a salt associated with the identity from a remote server;
creating a hash of the password information using the salt;
sending the hash to a remote server;
receiving results of an indication that the hash matches a stored password hash for the identity; and
performing a protective action in response to the receiving.

15. An apparatus, comprising:
a communication interface;
a memory; and
a processor connected to the communication interface and the memory, the processor is configured to:

recognize input of password information for a user that is authenticated on the apparatus, obtain a salt associated with the user from a remote server, hash the password information using the salt, send the hashed password information to the remote server, receive results of an indication of whether the hashed password information matches a stored hash of a password for the user, and performing a protective action if the hashed password information matches the stored hash of the password for the user.

16. The apparatus of claim 15, further comprising:

a computing system configured to perform access management service for a network resource, the computing system includes the remote server, the computing system is configured to maintain user accounts for accessing the network resource, the user is associated with a first user account for accessing the network resource, the salt is associated with and unique to the first user account, the computing system is configured to lock the first user account by preventing the network resource from being accessed with the first user account if the hashed password information matches the stored hash of the password for the user.

17. A computer implemented method for secure data leak detection, comprising:

creating a session between a computing device and an access management system using a user identification;

during the session between the computing device and the access management system, identifying information input to the computing device;

during the session between the computing device and the access management system, the computing device requesting from the access management system a random value previously stored for and associated with the user identification, the computing device is aware of the user identification based on the session;

the access management system using the user identification to identify the random value previously stored for and associated with the user identification;

the access management system sending the random value previously stored for and associated with the user identification to the computing device;

the computing device using a one way transformation operation to transform the information and the random value to create a new transformed result;

during the session between the computing device and the access management system, forwarding the new transformed result to the access management system;

the access management system using the user identification to identify a pre-stored transformed result;

the access management system comparing the pre-stored transformed result to the new transformed result;

determining that the new transformed result matches the pre-stored transformed result; and performing a protective action in response to the determining that the new transformed result matches the pre-stored transformed result.

18. The computer implemented method for secure data leak detection of claim 17, wherein:

the performing a protective action comprises the access management system locking out the user identification from access a network resource protected by the access management system.

19. The computer implemented method for secure data leak detection of claim 17, wherein:

the creating the session, identifying information, using a one way transformation operation and forwarding the transformed result are performed by a browser extension operating with a browser on the computing device; and the performing a protective action comprises the browser extension blocking submission of the information.

20. The computer implemented method for secure data leak detection of claim 19, wherein:

the random value is a salt; and the transformation operation creates a hash of the information and the salt.

* * * * *